(12) United States Patent
Boyes et al.

(10) Patent No.: US 7,940,684 B2
(45) Date of Patent: May 10, 2011

(54) VOICE OVER INTERNET PROTOCOL (VOIP) TESTING

(75) Inventors: David John Boyes, Roanoke, VA (US);
Jason Lee Davis, Roanoke, VA (US);
Michael Thad Ward, Salem, VA (US)

(73) Assignee: Acterna LLC, Germantown, MD (US)

( * ) Notice: Subject to any disclaimer, the term of this patent is extended or adjusted under 35 U.S.C. 154(b) by 213 days.

(21) Appl. No.: 12/189,369

(22) Filed: Aug. 11, 2008

(65) Prior Publication Data
US 2009/0046590 A1    Feb. 19, 2009

Related U.S. Application Data

(60) Provisional application No. 60/955,449, filed on Aug. 13, 2007, provisional application No. 60/970,025, filed on Sep. 5, 2007.

(51) Int. Cl.
*G06F 11/00* (2006.01)

(52) U.S. Cl. .......... 370/250; 370/352; 370/525; 379/21; 379/27.02

(58) Field of Classification Search .................. 370/241, 370/252, 395, 5
See application file for complete search history.

(56) References Cited

U.S. PATENT DOCUMENTS

| | | | |
|---|---|---|---|
| 6,940,849 B2 * | 9/2005 | Eichen et al. ................. | 370/352 |
| 7,369,537 B1 * | 5/2008 | Kirchhoff et al. ............. | 370/352 |
| 2004/0208186 A1 * | 10/2004 | Eichen et al. ................. | 370/401 |
| 2005/0222815 A1 * | 10/2005 | Tolly ............................. | 702/185 |
| 2007/0107034 A1 * | 5/2007 | Gotwals ......................... | 725/129 |
| 2009/0106599 A1 * | 4/2009 | Cheng ............................ | 714/38 |
| 2009/0327499 A1 * | 12/2009 | Strickland et al. ............ | 709/228 |

\* cited by examiner

*Primary Examiner* — Seema S Rao
*Assistant Examiner* — Henry Baron
(74) *Attorney, Agent, or Firm* — Matthew A. Pequignot; Pequignot + Myers LLC

(57) ABSTRACT

A method and apparatus for testing a VoIP telephone line are provided, the method including determining which of a plurality of VoIP call control protocols and/or CODECs is compatible with the telephone line, and conducting a series of tests on the telephone line in accordance therewith. The method and apparatus also includes steps and the means to connect to a network and capturing a stream of data therefrom to determine configuration settings of a VoIP telephone connected thereto to facilitate the previous testing.

23 Claims, 6 Drawing Sheets

VOICE OVER INTERNET PROTOCOL (VOIP) TESTING

CROSS-REFERENCE TO RELATED APPLICATIONS

This application claims priority under 35 U.S.C. §119 to U.S. Provisional Patent Application No. 60/955,449 filed on Aug. 13, 2007, and to U.S. Provisional Patent Application No. 60/970,025 filed on Sep. 5, 2007, the disclosures of which are incorporated herein by reference in their entireties.

BACKGROUND OF THE INVENTION

The present disclosure relates to testing of Voice over Internet Protocol (VoIP) equipment, and more particularly relates to a system and method for inspecting, detecting, testing and analyzing the configuration of a VoIP line, circuit or connection.

There are various VoIP service providers, VoIP switch vendors, and call controls. Each call control has various configuration parameters such as encoder/decoder (CODEC), frame rate, password, username, port number, IP address, and the like. Call control is a process used in telecommunications networks to establish, monitor and maintain connections.

In VoIP systems, call control is used to control connections between endpoints, or between endpoints and gatekeepers. H.323 is an International Telecommunication Union (ITU) standard for digital communication between terminals, network equipment and services.

In a VoIP network, call control is one of three major categories of communications traffic. The other two categories include signaling and media communications. H.323 call controls use Q.931, a connection protocol for digital networks, including VoIP systems. Messages are transmitted as octets as specified in ITU H.245, which resolves the type of call media to be used, such as unrestricted digital, 64K voice, 3.1K audio, and video, and then manages the connection after it has been established. Call control functions may include, but are not limited to, the determination of master/slave status for the endpoints, monitoring of the status of the endpoints, modification of the parameters of a connection, termination of a connection, and restarting a terminated or failed connection.

There are several protocols typically used for VoIP. These protocols define ways in which CODECs and devices connect to each other, and to the network, using VoIP. The protocols further include specifications for audio CODECs. The most widely used protocol is H.323. H.323 is a standard approved by the International Telecommunication Union (ITU) in 1996 to promote compatibility in videoconference transmissions over IP networks. H.323 was originally promoted as a way to provide consistency in audio, video and data packet transmissions in the event that a local area network (LAN) did not provide guaranteed Quality of Service (QoS). Although it was doubtful at first whether manufacturers would adopt H.323, it is now considered to be the standard for interoperability in audio, video and data transmissions as well as Internet telephone and VoIP. H.323 addresses call control and management for both point-to-point and multipoint conferences as well as gateway administration of media traffic, bandwidth and user participation.

H.323, which describes how multimedia communications occur between terminals, network equipment and services, is part of a larger group of ITU recommendations for multimedia interoperability called H.3x. The latest of these recommendations, H.248, is a recommendation to provide a single standard for the control of gateway devices in multi-media packet transmissions to allow calls to connect from a LAN to a Public Switched Telephone Network (PSTN), as well as to other standards-based terminals. This recommendation was announced in August 2000, by the ITU-TU Study Group 16 and the Megaco Working Group of the Internet Engineering Task Force (IETF).

Various controls and call signals are used. H.245 is used to negotiate channel usage and capabilities. Q.931 is used for call signaling and call setup. Registration/Admission/Status (RAS) is a protocol used to communicate with a Gatekeeper. Audio CODECs include G.711, G.723 and G.729. Video CODECs include H.261 and H.263. RTP/RTCP is used for sequencing audio and video packets.

A gatekeeper is a management tool or call manager for H.323 multimedia networks. A single gatekeeper controls interactions for each zone, which includes the terminals, multipoint control units (MCU), and gateways within a particular domain. Although the gatekeeper is an optional component, it becomes the central administrative entity when it is included.

Depending on the demands of the specific network, the gatekeeper oversees authentication, authorization, telephone directory and private branch exchange (PBX) services, as well as call control and routing. Other functions may include monitoring the network for load balancing and real-time network management applications, intrusion detection and prevention, and providing interfaces to legacy systems. Gatekeepers are available as either hardware devices or software applications, and are offered as proprietary products from a number of vendors such as Cisco and Symantec, or as freeware.

Other VoIP protocols include SIP, MGCP, and SCCP. Session Initiation Protocol (SIP) is one of the fundamental parts of the new software face of telecom, providing the basic signaling protocol needed to initiate, manage, and terminate multimedia, such as voice, data, video and audio communications sessions. SIP is a signaling protocol for Internet conferencing, telephony, presence, events notification and instant messaging. SIP was developed by the Internet Engineering Task Force (IETF).

SIP is used for setting up, controlling and tearing down sessions on the Internet. Sessions include, but are not limited to, Internet telephone calls and multimedia conferences. SIP is also used for instant messaging and presence. SIP was designed for managing sessions or connections, whereas H.323 was designed for multimedia conferencing. VoIP falls within the scopes of both protocols.

SIP is a request-response protocol that closely resembles two other Internet protocols, HTTP and SMTP, the protocols that power the World Wide Web and email. Consequently, SIP works comfortably alongside other Internet applications. Using SIP, telephony becomes another web application and integrates easily into other Internet services. For example, SIP uses a SIP URL, where every endpoint on the VoIP system has a SIP URL for identification. The URL for John Smith at rogers.com might be: sip:jsmith@rogers.com. The URL resembles an email address, whereby if placed on a web page, clicking the URL will initiate a telephone call to that SIP endpoint. If calling a telephone number on the PSTN, the URL may have the format of: SIP:5233784@gateway, where gateway is the name of a machine that acts as a gateway to the PSTN. A SIP server may include some or all of the above functions, or the functions can be split between multiple machines.

Media Gateway Control Protocol (MGCP) is used for controlling telephony gateways from external call control elements called media gateway controllers or call agents. A telephony gateway is a network element that provides conversion between the audio signals carried on telephone circuits and data packets carried over the Internet or over other packet networks.

MGCP assumes a call control architecture where the call control intelligence is outside the gateways and handled by external call control elements. MGCP assumes that these call control elements, or Call Agents, will synchronize with each other to send coherent commands to the gateways under their control. MGCP is a master/slave protocol, where the gateways are expected to execute commands sent by the Call Agents. MGCP implements the media gateway, control interface as a set of transactions. The transactions are composed of a command and a mandatory response.

Skinny Client Control Protocol (SCCP) is a Cisco proprietary protocol used between Cisco Call Manager and Cisco VoIP telephones. It is also supported by some other vendors.

CODECs are used to convert an analog voice signal into a digitally encoded version, and vice-versa. CODECs vary in sound quality, bandwidth requirements, and computational requirements. Each service, program, telephone or gateway typically supports several different CODECs. When talking to each other, each service, program, telephone or gateway negotiates which CODEC they will use. Examples of CODECs include G.711A, G.711U, G.723, G.723.2, G.726, G.729A, and GSM.

A digital signal processor (DSP) IC can be a versatile, multi-functional Analog Front-End integrated circuit, featuring the combination of one or more CODECs, a DSP, Analog multiplexers (MUX) and amplifiers with programmable gain. A DSP IC may have various peripheral interfaces on a single chip. Some DSP ICs may be loaded and reloaded on the fly as a new call comes in. Such an IC can reload with a new CODEC in a fraction of a second, before the call is connected, thus allowing the user a wide list of supported CODECs using just one IC part.

Any technical terms not explicitly defined herein are well known in the art. In addition, definitions of terms are located in the RFC 3261 and 2327 documents, which can be obtained from the IETF website at www.rfc-editor.org.

A common problem in VoIP is that a user or technician may need to unplug a phone or device, which may not be functioning correctly, and connect a test set that will emulate the device. Unfortunately, the disconnected phone or device may have many configurations and settings that it uses to correctly register, place and/or receive calls with the switch. Current solutions include a) using the phone menu to manually review and copy current settings, such as IP address, DNS server, call manager IP, call manager port, CODEC used, and the like; or b) using a laptop PC or analyzer to capture the stream of traffic, and have a human expert read and sort through the messages for the desired information.

Unfortunately, many technicians do not have the time or expertise to read and thoroughly understand Ethernet VoIP traces. Technicians are generally faced with an increasing number of duties to perform in a decreasing amount of time, with even less time available for training. Typically, configuration errors may cause hours of troubleshooting and lost labor while calling telephone support or changing configuration items and analyzing VoIP traffic traces. Thus, an automated VoIP test and analysis solution is desired to reduce the time and expertise that a technician would need to troubleshoot VoIP lines.

SUMMARY OF THE INVENTION

These and other issues are addressed by a method and apparatus for VoIP testing. Exemplary embodiments are provided.

An exemplary apparatus embodiment of the present disclosure provides a portable test device for testing a telephone line on a VoIP network, the device having a master control unit, a graphical display unit in signal communication with the master control unit, a user interface unit in signal communication with the master control unit, a CODEC unit in signal communication with the master control unit, and a coupler in signal communication with the master control unit, wherein the portable test device is configured to implement a suite of tests that run automatically from the test device, and to provide results responsive to the tests indicative of which call control protocols and CODECs are supported by the VoIP network.

An exemplary method embodiment of the present disclosure provides a method for testing a VoIP telephone connection, the method including a) connecting a portable test device to a network access point, b) running an information gathering software program on the VoIP telephone connection requesting information from a user on one or more of IP address of call manager, IP address of gatekeeper, line call control, line CODEC, line password, and line port number, c) making telephone calls on the telephone connection using a plurality of different vendor call controls, d) running a series of test programs using the plurality of different vendor call controls, and e) generating a report on the VoIP telephone configuration and results of test programs run, wherein the steps b), c) and d) are run automatically by the test device thereby enabling the user to diagnose problems with the VoIP telephone connection.

Another exemplary method embodiment of the present disclosure provides a method for testing a VoIP telephone connection to a VoIP network, including a call manager, at a network access point, the method including a) connecting a test device, which includes a plurality of test programs and a first plurality of different CODECs, b) determining whether the VoIP telephone connection is compatible with a first VoIP protocol by attempting to register with the call manager with a registration signal compatible with the first VoIP protocol, c) determining the compatibility of the VoIP telephone connection with a second plurality of different CODECs larger than the first plurality of different CODECs by transmitting a plurality of registration messages including CODEC identifications of the second plurality of CODECs therein to the call manager, and receiving response signals from the call manager indicative of whether the CODEC corresponding to the CODEC identifications are compatible, thereby eliminating a need to place a VoIP telephone call using the CODEC, d) generating a report of CODECs compatible with the VoIP telephone connection, and e) executing a series of the plurality of test programs based on the first plurality of CODECs, which are supported by the VoIP protocol.

Yet another exemplary method embodiment of the present disclosure provides a method of testing a telephone line connected to a VoIP network having a call manager, the method including a) determining which of a plurality of VoIP call control protocols is compatible with the telephone line, and b) conducting a series of tests on the telephone line in accordance with results of step a).

Still another exemplary method embodiment of the present disclosure provides a method of testing a VoIP telephone line connected to a VoIP network, which includes a call manager, the method including a) determining which CODEC is compatible with the telephone line, and b) conducting a series of tests on the telephone line in accordance with results of step a).

The present disclosure will be further understood from the following description of exemplary embodiments, which is to be read in connection with the accompanying drawings.

BRIEF DESCRIPTION OF THE DRAWINGS

The present disclosure will be described in greater detail with reference to the accompanying drawings, which represent exemplary embodiments thereof, in which.

DETAILED DESCRIPTION OF PREFERRED EMBODIMENTS

The present disclosure provides a method and apparatus for testing or troubleshooting a Voice over Internet Protocol (VoIP) connection. The disclosure addresses determination of the system configuration for a VoIP telephone connection given the variety of vendors and call control systems in use. A set of tests is run automatically to get the required information needed for troubleshooting the VoIP telephone connection. An advantage of running the tests automatically is that the skill-level requirements may be reduced for technicians to troubleshoot the VoIP telephone connections.

A common problem in VoIP telephone connections is determining the phone configuration parameters or settings. The present disclosure solves this problem of determining the VoIP telephone configuration settings by monitoring and analyzing the data traffic between a VoIP telephone and its network. The data traffic is captured and analyzed in order to determine the configuration settings. Thus, a VoIP device can be configured to emulate the VoIP telephone and used to troubleshoot or conduct tests.

Embodiments of the present disclosure facilitate the testing and troubleshooting of VoIP connections by automatically scanning and interpreting the contents of TCP/IP packets. Thus, the present disclosure provides automated testing and analysis for determining the configuration and status of VoIP systems. Exemplary embodiments are described.

Figure 1:
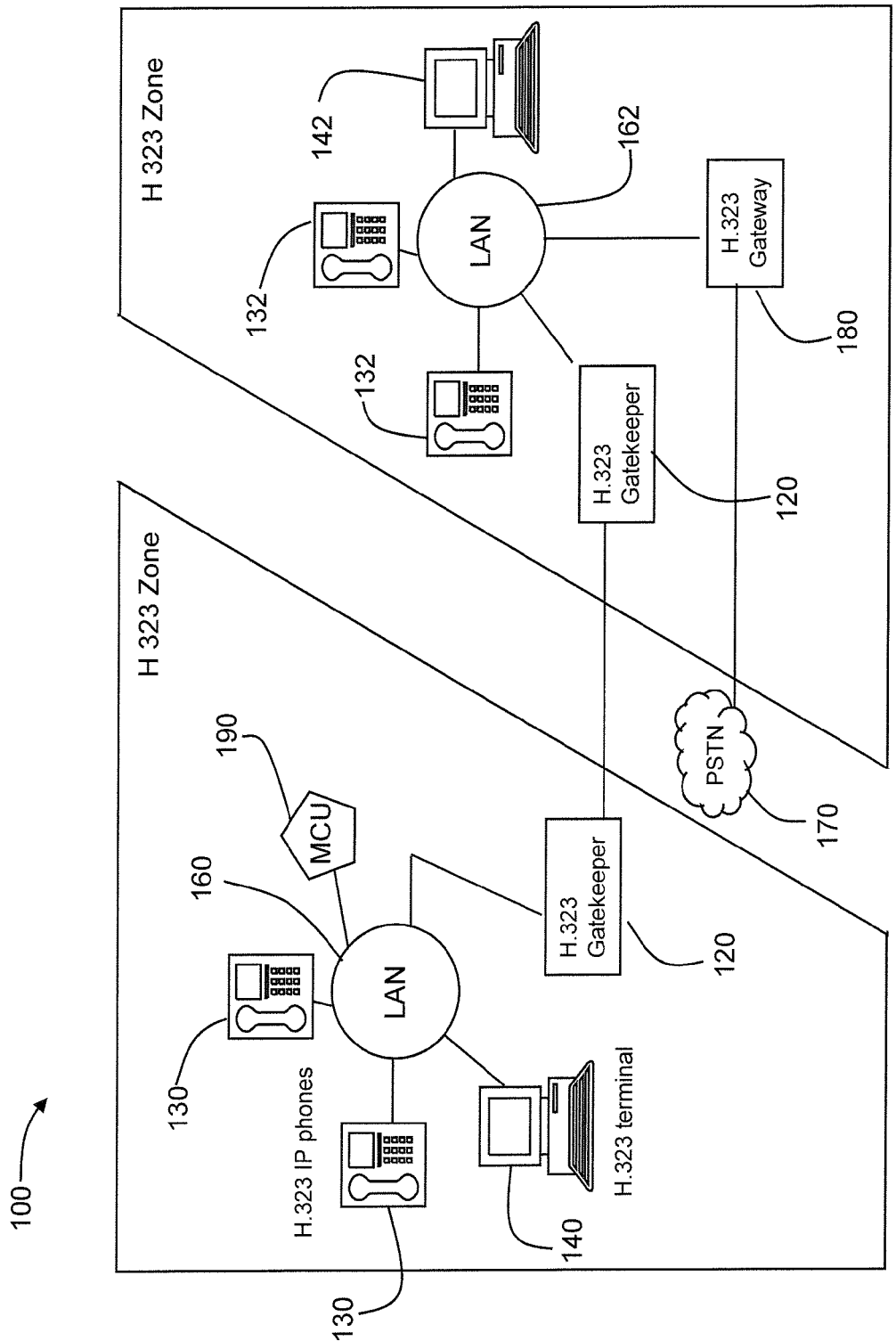
FIG. 1 is a schematic representation of a H.323 VoIP network in accordance with an exemplary embodiment of the present disclosure.

As shown in FIG. 1, a VoIP telephone system is generally indicated by the reference numeral 100. The VoIP telephone system 100 includes a first Local Area Network (LAN) 160 and a second LAN 162. The first LAN 160 is connected to at least one H.323 IP telephone 130, an H.323 terminal 140, a multipoint control unit (MCU) 190, and a first call manager or H.323 Gatekeeper 120. The second LAN 162 is connected to at least one H.323 IP telephone 132, an H.323 terminal 142, an H.323 Gateway 180, and a second call manager or H.323 Gatekeeper 120. The first call manager 120 of the first LAN 160 is connected to the second call manager 120 of the second LAN 162. In addition, the Gateway 180 of the second LAN 162 is connected to an external Public Switched Telephone Network (PSTN) 170.

The call manager 120, such as an H.323 Gatekeeper, provides the management of the telephone calls. The function of the call manager 120 is comparable to the function that SS7 performs in a public switched telephone network (PSTN). If two telephones are registered to the same Gatekeeper, then a connection can be made by dialing an alias (e.g., 555-1212), whereby the gatekeeper will determine the IP address. Each H.323 zone includes a plurality of IP telephones 130 and 132 and/or computer terminals 140 and 142 enabling VoIP communications, all connected to a local area network (LAN) 160 and 162.

The call manager 120 establishing a call requires address resolution, which is the way that the originating caller identifies the recipient, such as by telephone number, name, extension or IP address, which must be mapped to that recipient's IP address if the recipient is also using VoIP. On the other hand, if the recipient is on an external telephone system, the call manager 120 must forward the request to a PSTN 170, via an access device, such as a VoIP gateway 180. Multipoint Control Units (MCU) 190 support conferences between three or more endpoints. Conferencing can be audio, video and/or data.

The call manager 120 then proceeds to initiate the call, by using H.225, SIP, or proprietary signaling to contact the called party. Upon a successful connection, the call manager 120 "hands off" the call to the two connected telephones or telephone-gateway pair. If the call cannot go through because the called telephone was in use or otherwise unavailable, the call manager 120 will then inform the caller with a busy signal or redirect the call to an automated attendant or voice mail system.

The call manager 120 can also control or limit access to the telephone system to authorized and registered endpoints, such as IP telephones and computers. Endpoints unknown to the administrator can be disallowed. Connections can be disallowed if the system has no more bandwidth. A percentage of the bandwidth of the network may be reserved for data or some critical usage. The call manager 120 may also restrict the number of people participating in a video/audio conference.

One of the call managers 120 manages a respective zone, defined as the endpoint devices that register therewith, including maintaining a real time list of calls in progress in order to provide a busy signal as required. The call managers 120 also provide some of the services that a traditional PBX provides, such as call hold, call transfer, call forwarding and call waiting.

The call manager 120 can be a dedicated box, integrated into another box such as a router, or be software residing on a server. The call control functions used by the call manager 120 are typically H.323 or SIP. In addition, other protocols, such as Cisco's proprietary SKINNY protocol, may also be used.

H.323 is an International Telecommunication Union (ITU) standard for digital communication between terminals, network equipment and services. In such H.323 VoIP systems, call control is used to control connections between endpoints 130, 132, 140 and 142, or between the endpoints 130, 132, 140 and 142 and the gatekeepers 120.

Figure 2:
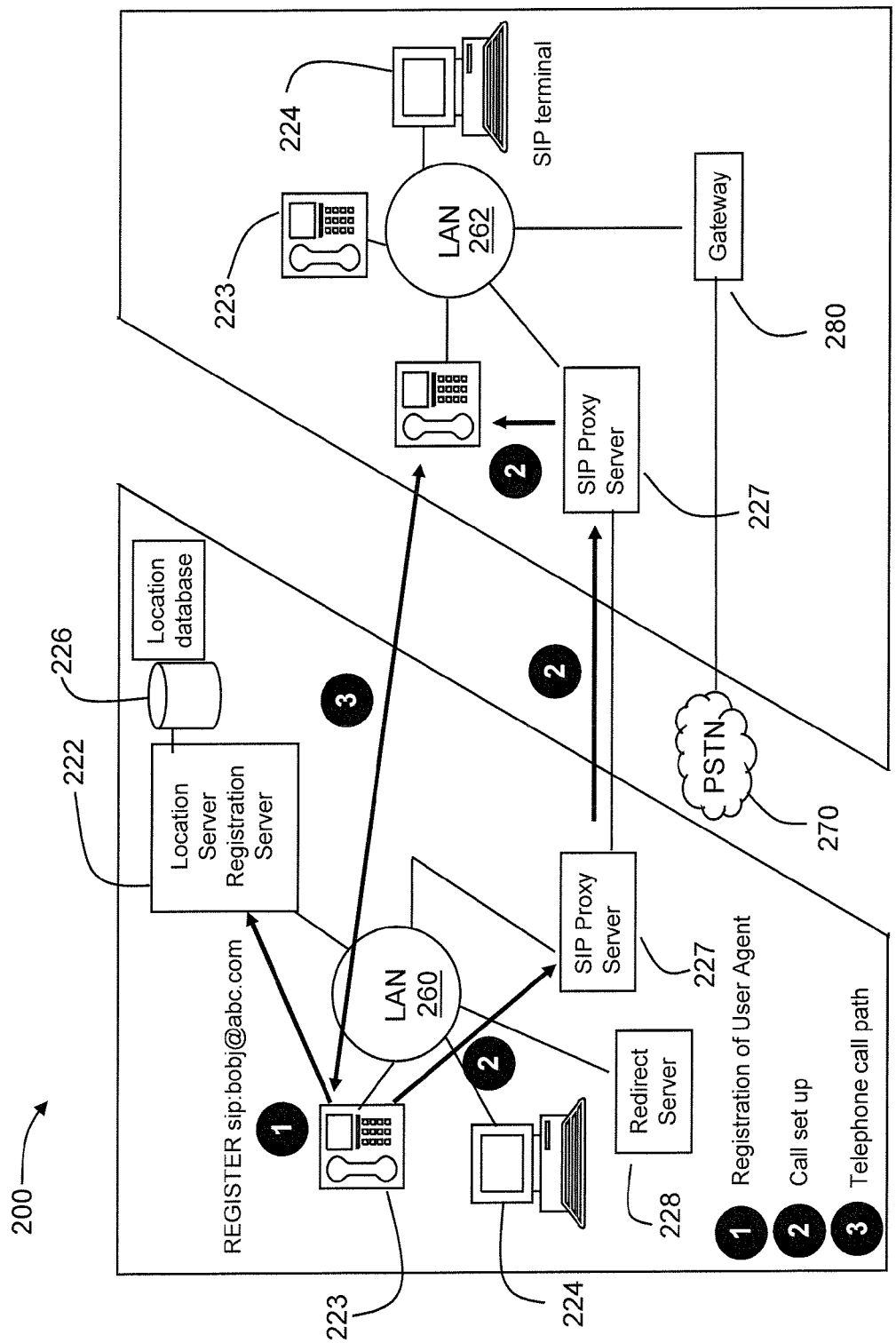
FIG. 2 is a schematic representation of a SIP VoIP network in accordance with an exemplary embodiment of the present disclosure.

Turning to FIG. 2, a SIP network is generally indicated by the reference numeral 200. The SIP network 200 includes a first LAN 260 and a second LAN 262. The first LAN 260 is connected to at least one SIP telephone 223, a SIP terminal 224, a Redirect server 228, a Registration/Location Server 222, and a call manager or SIP Proxy Server 227. The Location Server 222 is connected to a Location Database 226. The second LAN 262 is connected to at least one SIP telephone 223, a SIP terminal 224, a SIP Gateway 280, and a second SIP Proxy Server 227. The first SIP Proxy Server 227 of the first LAN 260 is connected to the second SIP Proxy Server 227 of the second LAN 262. In addition, the Gateway 280 of the second LAN 262 is connected to an external PSTN 270.

The registration/location server 222 authenticates users such as IP telephones 223 and SIP compatible computer terminals 224, and adds the mapping between URLs and network addresses to a location server's database 226. When a user agent starts up, the first message it sends is a REGISTER message. A location database 226 maintains a database of name to location mappings, generally including IP addresses. The information in the database 226 may be acquired from the user agent registrations, but may also be acquired in other ways, such as via a domain name server (DNS). The database 226 may be queried in various ways, although Lightweight Directory Access Protocol (LDAP) is the most common method. When a user wants to connect to a remote SIP endpoint, the user agent queries the location database 226 in the registration/location server 222 for the contact information.

Proxy servers 227 act on behalf of user agents, routing SIP messages to the correct destinations. A redirect server 228 differs from the proxy servers 227 in that it does not forward messages, but looks up a location and returns one or more addresses for the destination. The original user agent may then contact the destination directly at the returned addresses.

Figure 3:
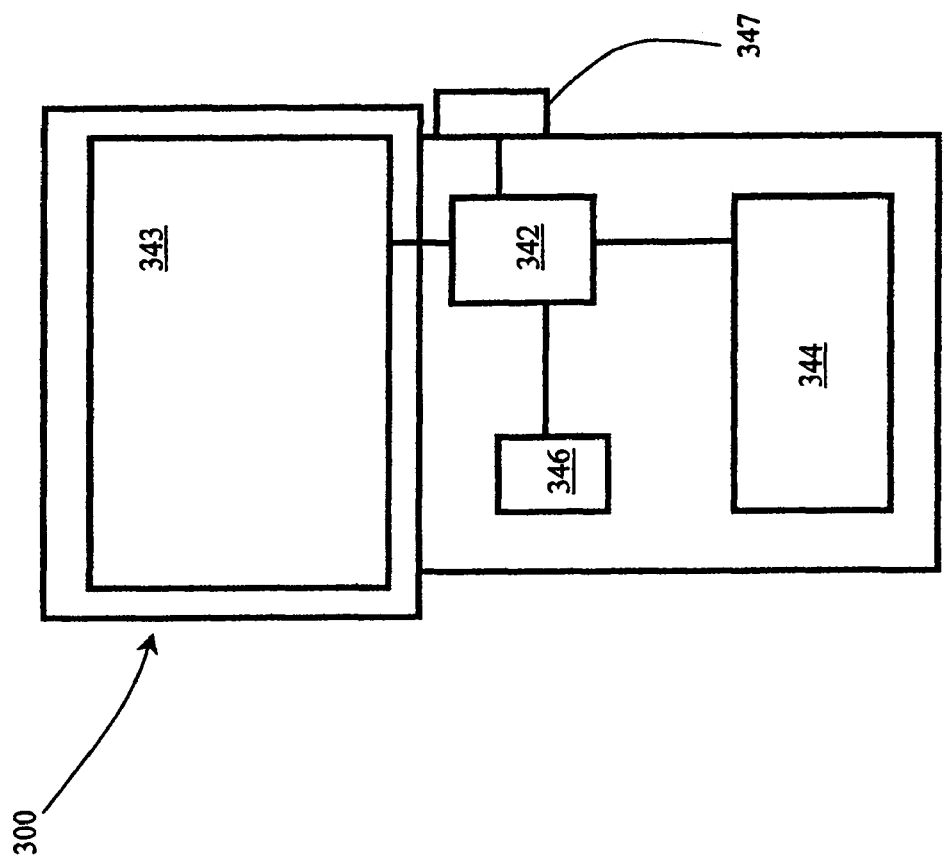
FIG. 3 is a schematic representation of a testing device in accordance with an exemplary embodiment of the present disclosure.

Turning now to FIG. 3, a VoIP detective is generally indicated by the reference numeral 300. The VoIP detective 300 is a testing device that includes a master control unit 342 connected to each of a graphical display 343, a user interface 344, a CODEC unit 346, and a coupler 347. The VoIP detective 300 implements a suite of tests that run automatically from the testing device 300, and then provides a technician with a list of what is known and what is still unknown about the VoIP network under test.

The coupler 347 is provided for receiving an eight-pin end coupler for coupling the testing device 300, including the master control 342, to a network via a 10/100 Ethernet cable. The VoIP detective 300 of FIG. 3 may be connected to the LAN 160 or 162 of FIG. 1, or to the LAN 260 or 262 of FIG. 2, just like any other IP telephone.

First, the master control unit 342 in the testing device 300 generates a series of questions on the graphical display 343 for the technician to answer and enter into the testing device 300 via the user interface 344. The questions relate to simple information about the network, such as IP address of a known call manager and gatekeeper. The master control 342 then asks whether the technician knows anything else about the line, such as call control, CODEC, password, port number or like information.

If the type of call control or VoIP protocol is not known, then the master control unit 342 sends registration messages having a string of bits including the designated port numbers and telephone number or alias to a network call manager using a first VoIP protocol, such as H.323, and awaits a response. If a positive registration response is received, then the master control unit 342 determines that the line is compatible with the first VoIP protocol, and selects a subset of the suite of tests corresponding to the first VoIP or optionally conforms a selected number of the tests to be compatible with the first VoIP protocol. If the first VoIP protocol is not compatible with the line, then the registration message will be rejected by a line switch. Subsequently, a second registration message is sent to the network call manager using a second VoIP protocol, such as SIP. If a positive registration response is received, then the master control unit 342 determines that the line is compatible with the second VoIP protocol, and selects a subset of the suite of tests corresponding to the second VoIP or optionally conforms a selected number of the tests to be compatible with the second VoIP protocol. This process continues for other VoIP protocols, until a list of compatible VoIP protocols is determined.

The CODEC unit 346 may include a plurality of CODECs, depending upon the technician's needs to make actual calls on the test line. In one embodiment, a CODEC DSP integrated circuit (IC) is provided as the CODEC unit 346, including only two or three of the most common CODECs, such as G.711U, G.729A, G.711A and/or GSM. The CODEC DSP 346 can be loaded and reloaded on the fly as a new call comes in. The CODEC DSP 346 can reload with a new CODEC in a fraction of a second, before the call is connected, thus allowing the user a wide list of supported CODECs using just one CODEC DSP IC part. The inclusion of all possible CODECs is possible, although costly, as each CODEC may add to the complexity of the DSP and/or have an associated licensing fee.

Although a given CODEC would have to be included to place an actual call using the CODEC, the CODEC need not be included if the testing does not require placing a call using that particular CODEC. That is, the testing device 300 can determine whether the line is compatible with a large range of video and audio CODECs, even though the testing device 300 does not support a particular CODEC, by including identification information for the CODEC in a SETUP message to a network call manager, such as to a gatekeeper 120 of FIG. 1 or a SIP Proxy server 227 of FIG. 2. If a response signal is returned to the master control 342 confirming setup, such as with a SETUP ACKNOWLEDGED, then the particular CODEC may be added to a list of compatible CODECs.

Moreover, additional registration messages can be sent to the network call manager to compile lists of compatible and incompatible CODECs for the tested line based on whether returning confirmation signals are received by the master control 342. Accordingly, an actual call using a real-time transport protocol (RTP) stream with a particular CODEC is not required to determine whether the VoIP line is compatible with the particular CODEC.

The testing device 300 asks the technician for the IP address and optionally the port number of the switch for a call agent that the technician desires to test. If the call control type is known, then the testing device 300 can display this information.

When a telephone company wants to test a VoIP telephone line that they have just delivered or installed in the absence of an expensive video telephone, for example, the testing device 300 can ask for permission by sending a registration signal to a call manager to place a video call, for example, and wait for the call manager to transmit a positive return registration signal, thereby connecting the line. Once connected to the call manager, the call manager will transmit a test pattern page for the technician to observe. Accordingly, even though the testing device 300 might not have a camera or stereo speakers, a technician can place a call and check the provisioning of the line, so that when the video telephone does arrive, the technician would not need to make another service visit to test the line again since she has already tested to the demarcation point of the telephone company.

Figure 4:
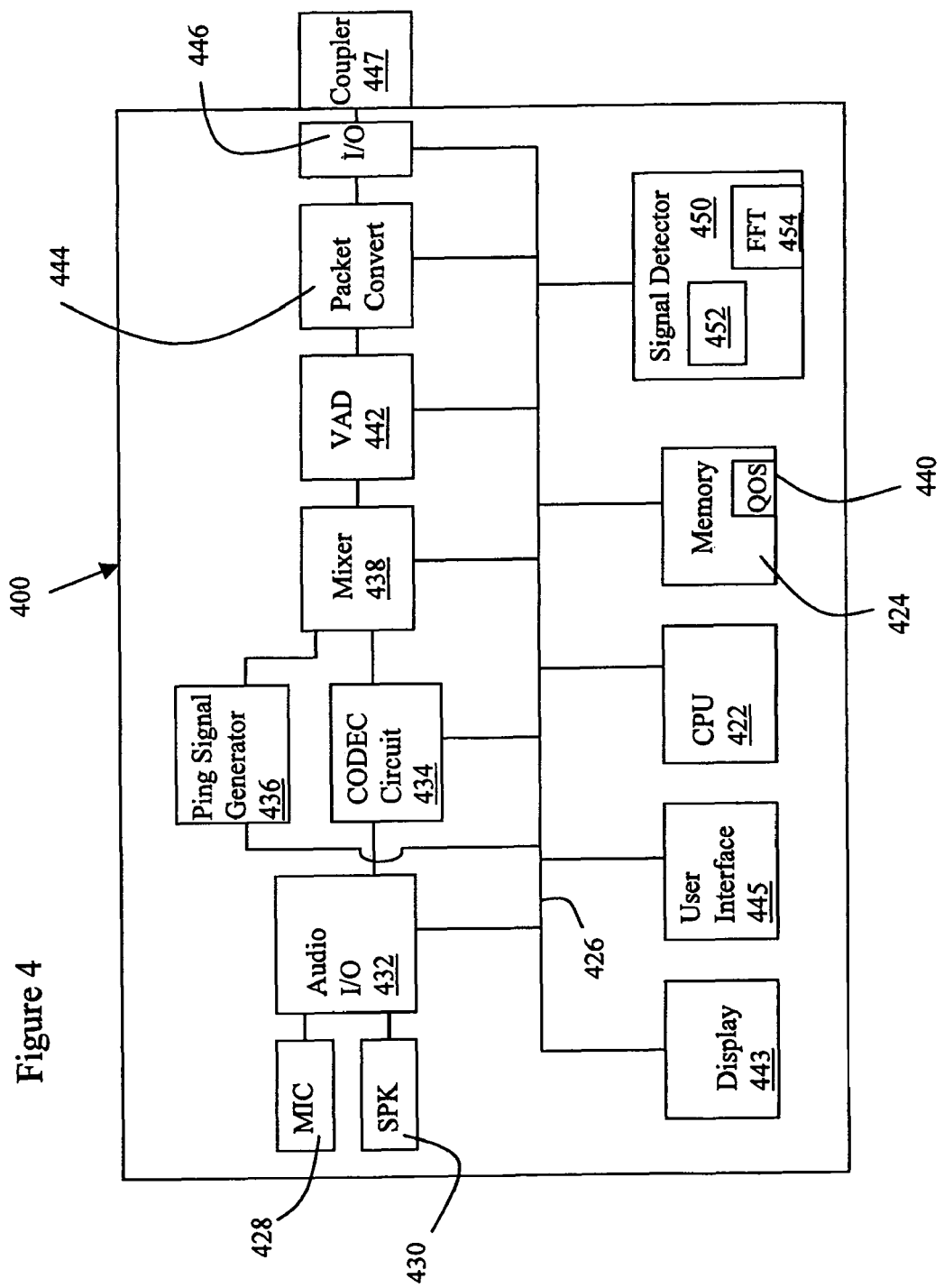
FIG. 4 is a functional block diagram of a telephone device that directly measures the network delay of voice data transmissions in accordance with an exemplary embodiment of the present disclosure.

As shown in FIG. 4, a VoIP detective embodied in a telephone is indicated generally by the reference numeral 400.

The VoIP detective telephone 400 is similar to the VoIP detective 300 of FIG. 3, and includes a CPU 422 connected to a common bus 426, and a memory 424 connected to the common bus, where the memory includes a Quality of Service (QOS) software program 440. A graphical display 443, a user interface 445, and a coupler 447 are each connected to the common bus 426. A microphone 428 and a speaker 430 are each connected to an audio I/O unit 432, which is connected to the common bus 426. A CODEC circuit 434 is connected to the audio I/O unit 432 and to the common bus 426.

In addition, a ping signal generator 436 is connected to the common bus 426. A mixer is connected to each of the CODEC circuit 434, the ping signal generator 436 and the common bus 426. A voice activity detection (VAD) circuit 442 is connected to the mixer 438 and to the common bus 426. A packet converter 444 is connected to the VAD 442 and to the common bus 426. An I/O circuit interface 446 is connected to each of the packet converter 444 and the common bus 426, and is further connected to the coupler 447. A signal detector 450 is connected to the common bus 426, and includes a comparator 452 and a fast Fourier transform (FFT) unit 454.

The VoIP detective telephone 400 directly measures the network delay of voice data transmissions using a ping signal. The processor 422 and memory 424 are connected to the common bus 426, and the memory 424 stores the QOS software program 440 that controls the injection and detection of the ping signal and measures the network delay of voice data transmissions through a communications network, such as the network 100 of FIG. 1 or 200 of FIG. 2. The microphone 428 and speaker 430 are connected to the audio I/O chip 432 that amplifies the signal to and from the CODEC circuit 434, which is connected to the bus 426.

The VoIP detective telephone 400 of FIG. 4 may be connected to the LAN 160 or 162 of FIG. 1, or to the LAN 260 or 262 of FIG. 2, just like any other IP telephone. In addition, when the VoIP detective telephone 400 is connected to one LAN, such as the LAN 160, a destination telephone may be connected to the same LAN 160, to a different LAN 162 in the same network 100, or to the PSTN 170, for example.

The CODEC circuit 434 converts an analog signal from the microphone 428 into a digital signal for transmission to the destination telephone and converts a digital signal representing a voice stream from the destination telephone into an analog signal for reproduction through the speaker 430. Under control of the QOS program 440, the ping signal is generated by the ping signal generator 436. In the embodiment shown, the ping signal is a digital signal. Alternatively, the ping signal can be an analog signal that is input to the CODEC circuit 434 for conversion to a digital signal. The mixer 438, connected to the bus 426 and under control of the QOS program 440, mixes the generated ping signal and the digital voice stream signal output of the CODEC circuit 434.

In one method, the ping signal is superimposed on the digital voice stream signal by multiplying or adding the two signals together. Alternatively, the mixer 438 replaces a portion of the digital voice stream signal with the ping signal. In either case, the ping signal is inserted into the voice stream signal.

The VAD circuit 442 is connected to the bus 426. The VAD circuit 442 receives and monitors voice activity on the output of the mixer 438. The VAD circuit 442 only generates digital voice stream data when there is voice activity or a ping signal, which is considered to be voice activity. The packet converter 444, connected to the bus 426, converts the digital voice stream from the VAD circuit 442 and formats it into a suitable series of packets according to the packet switch protocol being used. The I/O interface circuit 446 receives the data packets containing voice stream data and transmits them to the coupler 447 to be routed through the packet switched network, such as the network 100 of FIG. 1 or 200 of FIG. 2, and eventually to a destination telephone.

In the embodiment shown, the internal circuits of the destination telephone may be substantially the same as those in the VoIP detective telephone 400. The I/O circuit interface 446 receives the digital voice stream from the coupler 447. The received voice stream is then monitored by a signal detector 450 connected to the bus 426 and under control of the QOS program 440 running inside the destination telephone. The signal detector 450 includes a comparator 452 and a transform circuit 454, such as a fast Fourier transform (FFT) circuit that converts a digital voice stream in the time domain into a signal level in the frequency domain, that is, as a function of frequency. The transform circuit 454 can be implemented in dedicated hardware, as a combination of software and hardware such as a DSP IC, or purely in software executed by the processor 422.

Figure 5:
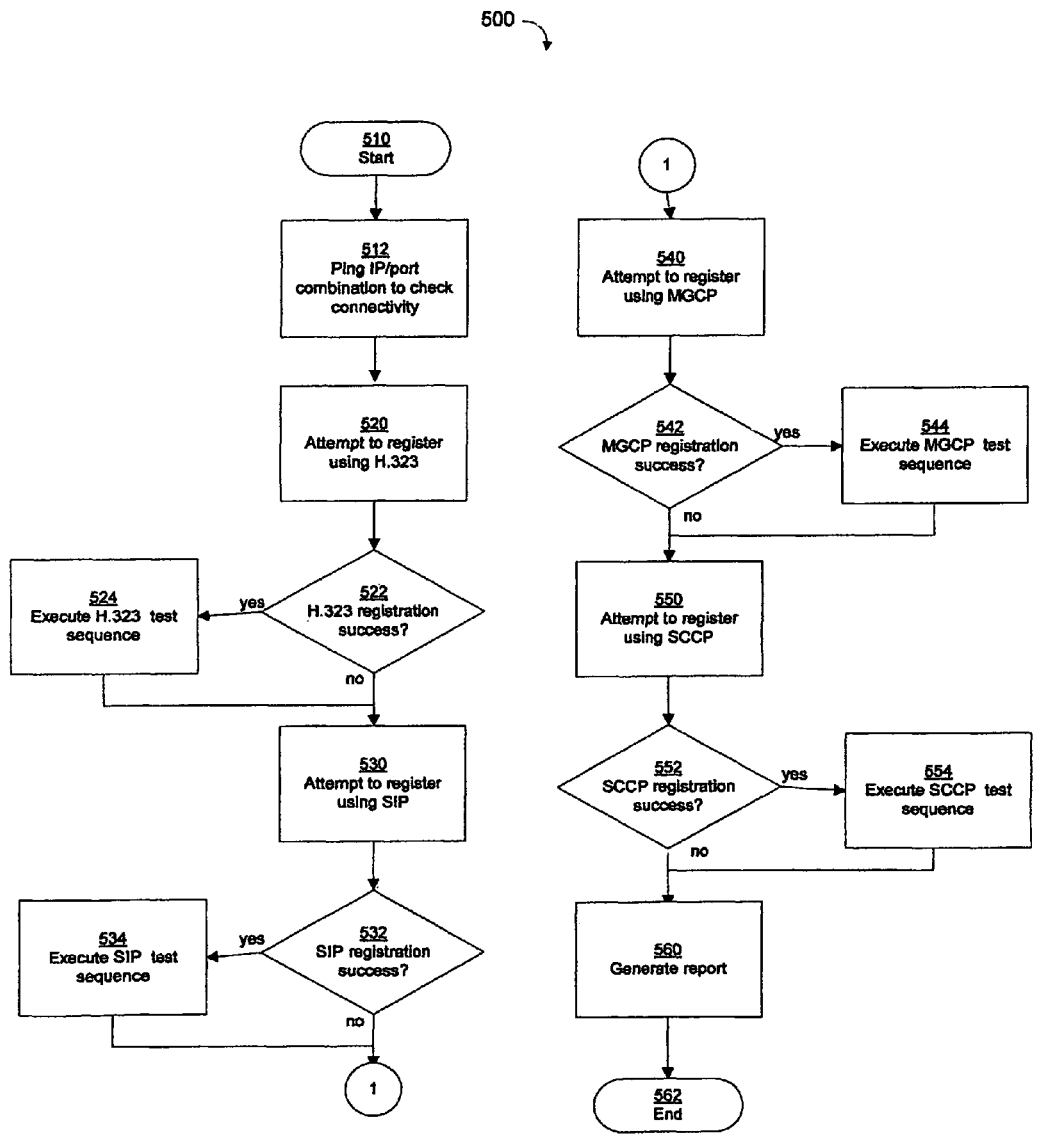
FIG. 5 is a method flow diagram for the testing device of FIG. 3 in accordance with an exemplary embodiment of the present disclosure.

Turning to FIG. 5, a method of operation of the VoIP detective 300 of FIG. 3 is indicated generally by the reference numeral 500. A Start block 510 passes control to a function block 512. At function block 512, the master control unit 342 of FIG. 3 pings the IP/port combination to check connectivity. For each of the following VoIP protocols, the master control unit 342 performs the tests described thereafter.

International Telecommunication Union (ITU) H.323 call-control details are addressed next. At function block 520, regardless of connectivity, the master control unit 342 attempts to register the testing device 300 as an H.323 telephone using a Registration Admission Status (RAS) Gatekeeper Request Message. At decision block 522, if a positive message is returned, the VoIP detective 300 will then continue with a series of H.323 tests.

Function block 524 executes an H.323 test sequence. The H.323 tests include checking to see if a password is required to place a telephone call; testing all known CODECs to see which are supported; determining the switch vendor by watching for known information elements in certain messages; checking to see if the switch will allow ENBLOCK or OVERLAP DIALING; checking to see if a backup Call manager is responding, such as by using current call agent IP address+1; attempting to place an outbound call; attempting to answer an incoming call; checking packet stream metrics for jitter, loss and delay; and checking one-way delay metrics such as by using the method of the VoIP detective telephone 400 of FIG. 4. Delay metrics are further discussed in co-pending U.S. patent application Ser. No. 11/372,673, filed Mar. 10, 2006.

Session Initiation Protocol (SIP) call-control details are addressed next. At function block 530, the master control unit 342 attempts to register with a SIP Proxy server using well-known port numbers and a SIP registration message. At decision block 532, if a positive message is returned, the VoIP detective 300 will then continue with a series of SIP based tests.

Function block 534 executes a SIP test sequence. The SIP tests include checking to see if a password is required to place a telephone call; testing all known CODECs to see which are supported; determining the switch vendor by watching for known information elements in certain messages; checking to see if the switch will allow ENBLOCK or OVERLAP DIALING; attempting to place an outbound call; attempting to answer an incoming call; checking packet stream metrics for jitter, loss and delay; and checking one-way delay metrics such as by using the method of the VoIP detective telephone 400 of FIG. 4.

Media Gateway Control Protocol (MGCP) call control details are addressed next. At function block 540, the master control unit 342 attempts to register with a MGCP Call Agent using well-known port numbers and a MGCP registration message. At decision block 542, if a positive message is returned, the VoIP detective 300 will then continue with a series of MGCP based tests.

Function block 544 executes an MGCP test sequence. The MGCP tests include testing all CODECs known to the VoIP detective 300 to see which are supported; determining the switch vendor by watching for known information elements in certain messages; checking to see if the switch will allow ENBLOCK or OVERLAP DIALING; attempting to place an outbound call; attempting to answer an incoming call; checking packet stream metrics for jitter, loss and delay; and checking one-way delay metrics such as by using the method of the VoIP detective telephone 400 of FIG. 4.

Skinny Client Control Protocol (SCCP) call control details are addressed next. At function block 550, the master control unit 342 attempts to register with a SCCP Call Manager with well-known port numbers and a SCCP registration message. At decision block 552, if a positive message is returned, the VoIP detective 300 will then continue with a series of SCCP based tests.

Function block 554 executes an SCCP test sequence. The SCCP tests include testing all known CODECs to see which are supported; determining the switch vendor by watching for known information elements in certain messages; checking to see if the switch will allow ENBLOCK or OVERLAP DIALING; attempting to place an outbound call; attempting to answer an incoming call; checking packet stream metrics for jitter, loss and delay; and checking one-way delay metrics such as by using the method of the VoIP detective telephone 400 of FIG. 4.

At output block 560, once the VoIP detective 300 has completed its tests, it generates a report, such as the exemplary report of Table A. Next, control passes to an end block 562.

Table A sets forth an exemplary report from the VoIP detective 300 of FIG. 3. The exemplary report of Table A indicates that the call control is H.323, and that CODECs G.711.U and G.729.A are compatible. In addition, the report of Table A indicates that other CODECs, such as G.711A, G.726 and G.723, are not compatible with the VoIP circuit under test.

TABLE A

| | |
|---|---|
| *hh:mm:ss 12 mm/dd/yyyy | |
| *12:18:16 PM 01/13/2007 | |
| #========================================= | |
| # IP Tests | |
| DHCP Server: | 10.1.208.2 |
| Assigned IP: | 10.1.208.44 |
| Assigned DNS #1: | 10.10.1.10 |
| Assigned DNS #2: | None |
| DHCP Server: | 10.1.208.2 |
| Lease Length: | 120 days |
| TFTP Server: | 10.1.208.54 |
| ========================================= | |
| #Call Control Detection | |
| Call Control: | H.323(Fast) |
| Vendor: | Nortel |
| Variant: | CS2000 |
| Sw Rev: | SN06.1 |
| CC Port: | 1720 |
| RAS Port: | 1719 |
| H.245 Tunnel: | YES |
| Alias: | 5551212 OK |
| Alias: | 5551213 REJECTED |
| Alias: | 5551214 OK |
| #========================================= | |

TABLE A-continued

| | |
|---|---|
| #Codec Report | |
| Primary Codec: | G.711 U law 64k |
| Secondary Codec: | G.729A |
| Failed Codec: | G.711 A law 64K |
| Failed Codec: | G.726 A law 64K |
| Failed Codec: | G.723 5.3K |
| Failed Codec: | G.723 6.3K |
| Failed Codec: | G.729AB |
| Failed Codec: | GSM (ESF) |
| Failed Codec: | GSM (FR) |
| Failed Codec: | G.726 32K |
| #========================================= | |
| #RTP Port Report | |
| Inbound Port: | 5005 |
| Outbound Port: | 500-6000 |
| #========================================= | |
| #Call Check | |
| Outbound Call: | PASS |
| Inbound Call: | FAIL |
| #========================================= | |
| #One Way Delay | |
| Outbound Call: | 25 ms |
| Inbound Call: | FAIL |
| #========================================= | |
| #Outbound Quality of Service | |
| Delay: 10 ms | PASS |
| Jitter: 30 ms | PASS |
| Loss .01% | PASS |
| #========================================= | |
| #Inbound Quality of Service | |
| Call Failed: | |
| #========================================= | |
| #Supplementary Services Check | |
| Call Hold: | PASS |
| DND: | FAIL |
| Call Forward Busy | FAIL |
| Call Forward No Answer | FAIL |
| Call Forward Unconditional | FAIL |
| Malicious Call ID | FAIL |

Figure 6:
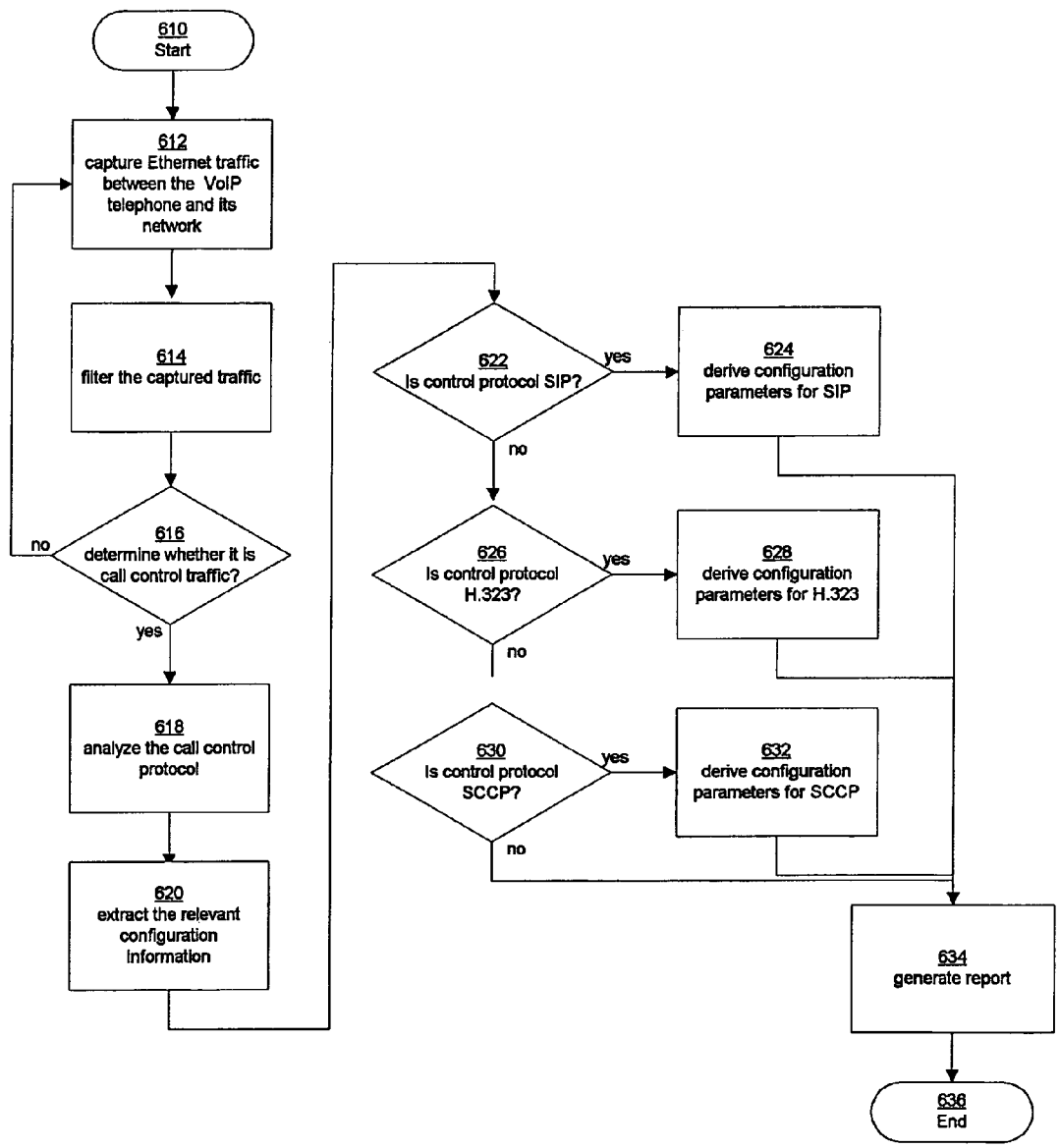
FIG. 6 is a method flow diagram for automatically inspecting a VoIP line in accordance with an exemplary embodiment of the present disclosure.

Turning now to FIG. 6, a VoIP inspector implements a method of automatically inspecting a VoIP line as indicated generally by the reference numeral 600. The VoIP inspector 600 is a configuration tool that can monitor Ethernet traffic to automatically determine the actual and correct setup parameters needed to emulate an existing VoIP connection, and includes an algorithm that interprets the messages monitored. Such Ethernet traffic may be obtained using a live stream, or a pre-captured file, for examples. The discovered configuration parameters may then be used to emulate the existing VoIP connection, such as by passing the discovered parameters to the VoIP detective 300 of FIG. 3, for example. Here, the VoIP inspector 600 may be in signal communication with the VoIP detective 300 of FIG. 3. Alternatively, the VoIP inspector 600 may be a part of the VoIP detective 300 of FIG. 3.

The VoIP inspector 600 includes a Start block 610, which passes control to an input block 612. The input block 612 captures Ethernet traffic between the VoIP telephone and its network, and passes control to a function block 614. The function block 614 filters the captured traffic, and passes control to a decision block 616. The decision block 616 determines whether it is call control traffic, such as by filtering the captured traffic based on well-known or user specified IP port and protocol (e.g., TCP/UDP) information, and passes control to a function block 618 if the traffic is call control traffic, or back to the input block 612 if the traffic is not call control traffic. The function block 618 analyzes the call control protocol once the traffic has been identified, and passes control to a function block 620. The function block 620, in turn, extracts the relevant configuration information, and passes control to a decision block 622. The decision blocks 622, 626 and 630 determine which call control protocol is in use (i.e., SIP, H.323, MGCP, SCCP, etc.), based upon the well-known port number, and pass control to function blocks 624, 628 and 632, respectively, to derive the relevant configuration parameters. Function blocks 624, 628 and 632, in turn, pass control to function block 634 for generation of a report. Function block 634 passes control to end block 636.

In an exemplary procedure for the call control protocol SIP (RFC 3261), the available configuration parameters and derivation thereof by analyzing the captured packets shall be described. Since SIP is a text based protocol, determining the type of message is done by comparing the first word of the message, such as REGISTER, INVITE or BYE, for example, to identify the type of message. Finding a particular field in a message, such as To, From or Contact, is also done by matching the first word in each line. Thus, the pertinent information is determined as follows:

1. Outbound proxy IP—Determined by extracting the destination IP address of the packet containing a REGISTER message.

2. Outbound proxy port—Determined by extracting the destination IP port number of the packet containing a REGISTER message.

3. Local port number—Determined by extracting the source IP port number of the packet containing a REGISTER message.

4. SIP domain—Determined by extracting the domain from the Request-URI portion of the first line of the REGISTER message.

5. Alias or phone number—Determined by extracting the user portion of the URI located in the "To:" line of the REGISTER message.

6. Username—Determined by extracting the user portion of the URI located in the "From:" line of the REGISTER message.

7. Preferred codec—Determined by extracting the codec item from media description lines of the SDP (RFC 2327) portion of the INVITE message.

In operation, the VoIP inspector can monitor the traffic on an existing line, and/or read back a captured trace, and scan the messages to determine what configuration values were used to place a previous call, for example. The system can then print, save and/or directly use such configuration values to connect a test set to the line and emulate the phone in question. The VoIP inspector 600 may operate automatically, or optionally operate interactively. In an interactive embodiment, it is also possible to have a test set, listen to the traffic on the line, analyze the settings, prompt a user to unplug the original device, and then allow the test set to emulate the unplugged device.

The VoIP inspector 600 can operate with all variants of call controls, such as H.323, SIP, MGCP, UniStim and SCCP, all CODECs, and all switch vendors. It can reduce the number of calls for technical support to a test set vendor, for example, as many such calls are simply customers asking about how to correctly configure a line to emulate a given phone. Once the VoIP inspector has completed its analysis, it can print a report or transfer the configuration parameters to a test set or VoIP detective that could then mimic the phone and place a test call.

Table B sets forth an exemplary report from the VoIP inspector. The VoIP inspector may be embodied within the VoIP detective 300 of FIG. 3, or it may be embodied separately and communicate with the VoIP detective.

TABLE B

```
*hh:mm:ss 12 mm/dd//yyyy
*12:18:16 PM 01/13/2001
#========================================
# inspector Results
Call Control                 H.323 (Fast)
Device Alias                 555-1212
Device IP address:           10.1.208.44
Device RAS port:             1719
Device CC port:              1720
Call Manager IP address:     192.168.0.97
Call Manager RAS port:       1719
Call Manager CC port:        1720
Starting RTP port number     5001
Silence Suppression used     YES
Password required            NO
Codec of connected call      G.729A
RTCP used                    YES
Call duration                15 seconds
Call completed successfully  YES
```

Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

What is claimed is:

1. A portable test device for testing a VoIP telephone line on a VoIP network, the device comprising:
    a master control unit;
    a graphical display unit in signal communication with the master control unit;
    a user interface unit in signal communication with the master control unit;
    a CODEC unit in signal communication with the master control unit; and
    a coupler in signal communication with the master control unit,
    a detector for determining which VoIP protocol is compatible with a VoIP telephone line;
    wherein the detector comprises a registration unit for issuing a registration message attempting to register with a call manager in the VoIP network with a registration signal compatible with a first VoIP protocol, and receiving a return signal from the call manager indicative of when the first VoIP protocol is compatible with the telephone line; and
    wherein the registration unit is for issuing a second registration message attempting to register with a call manager in the VoIP network with a registration signal compatible with a second VoIP protocol, and receiving a return signal from the call manager indicative of when the second VoIP protocol is compatible with the telephone line;
    wherein the portable test device is configured to implement a suite of tests that run automatically from the test device, and to provide results responsive to the tests indicative of which call control protocols and CODECs are supported by the VoIP network.

2. The device of claim 1, wherein the coupler is disposed for connecting the portable test device to a network access point;
    wherein the master control unit is disposed for running an information gathering software program on the VoIP network requesting information from a user one or more of IP address of call manager, IP address of gatekeeper, line call control, line CODEC, line password, and line port number, and for automatically running a series of test programs using a plurality of different call controls;

wherein the CODEC unit is disposed for automatically making telephone calls on the network using the plurality of different call controls; and wherein the user interface is disposed for displaying a report on the VoIP network and results of the test programs.

3. The device of claim 1, wherein the number of CODECs detectable by the device is greater than the number of CODECs implemented in the device.

4. The device of claim 1, further comprising a plurality of test programs for detecting different vendor call controls and a plurality of CODECs for making test calls.

5. A portable test device for testing a VoIP telephone line on a VoIP network, the device comprising:
a master control unit;
a graphical display unit in signal communication with the master control unit;
a user interface unit in signal communication with the master control unit;
a CODEC unit in signal communication with the master control unit; and
a coupler in signal communication with the master control unit,
wherein the master control unit comprises a registration portion for sending registration messages, including CODEC identifications for a plurality of CODECs, to a call manager in the VoIP network, and receiving response signals from the call manager indicative of when the CODECs corresponding to the CODEC identifications are compatible, thereby eliminating a need to place a VoIP telephone call using the CODEC;
wherein the portable test device is configured to implement a suite of tests that run automatically from the test device, and to provide results responsive to the tests indicative of which call control protocols and CODECs are supported by the VoIP network.

6. The device of claim 1, further comprising a CODEC tester for determining which CODECs are compatible with the telephone line.

7. The device of claim 5, further comprising a detector for determining which VoIP protocol is compatible with a VoIP telephone line;
wherein the detector comprises a registration unit for issuing a registration message attempting to register with a call manager in the VoIP network with a registration signal compatible with a first VoIP protocol, and receiving a return signal from the call manager indicative of whether the first VoIP protocol is compatible with the telephone line.

8. The device of claim 7, wherein the registration unit is for issuing a second registration message attempting to register with a call manager in the VoIP network with a registration signal compatible with a second VoIP protocol, and receiving a return signal from the call manager indicative of when the second VoIP protocol is compatible with the telephone line.

9. The device of claim 1, wherein the master control unit comprises a registration portion for sending registration messages, including CODEC identifications for a plurality of CODECs, to a call manager in the VoIP network, and receiving response signals from the call manager indicative of whether the CODECs corresponding to the CODEC identifications are compatible, thereby eliminating a need to place a VoIP telephone call using the CODEC.

10. The device of claim 1, wherein the master control unit comprises a metrics portion for determining at least one of jitter, loss or delay for a voice transmission over the VoIP network.

11. The device of claim 10, wherein the metrics portion comprises:
a ping signal generator;
a mixer operable to mix the generated ping signal and a voice stream signal to produce a mixed voice stream signal for transmission through the network to a destination device;
a signal detector operable to receive a mixed voice stream signal from the destination device and detect a return ping signal contained in the received mixed voice stream signal; and
a processor coupled to the signal detector and operable to determine the voice transmission delay between the test device and the destination device upon detection of the return ping signal by the signal detector based on the time of transmitting the ping signal and the time of detecting the return ping signal.

12. The device of claim 1, wherein the master control unit has registration capabilities for a plurality of call control protocols selected from the group comprising H.323, SIP, MGCP and SCCP.

13. The device of claim 1, wherein the CODEC unit has CODECs for at least one CODEC selected from the group comprising G.711A, G.711U, G.723, G.723.2, G.726, G.729A, GSM, H.261 and H.263.

14. The device of claim 1, further comprising:
communication connector for connecting the portable test device in signal communication with the VoIP network;
traffic generator for generating two-way traffic between a VoIP telephone and the VoIP network;
a capture device for at least one of monitoring or capturing the generated traffic;
an analyzer for analyzing the monitored or captured traffic to determine the configuration settings of the VoIP telephone;
a switch for at least one of disconnecting or disabling the VoIP telephone; and
a tester for emulating the VoIP telephone to conduct tests on the VoIP telephone line.

15. The device of claim 5, further comprising:
a detector for determining which VoIP protocol is compatible with a VoIP telephone line; and
a test section for conducting a series of tests on the telephone line in accordance with a detected protocol.

16. The device of claim 5, wherein the coupler is disposed for connecting the portable test device to a network access point;
wherein the master control unit is disposed for running an information gathering software program on the VoIP network requesting information from a user one or more of IP address of call manager, IP address of gatekeeper, line call control, line CODEC, line password, and line port number, and for automatically running a series of test programs using a plurality of different call controls;
wherein the CODEC unit is disposed for automatically making telephone calls on the network using the plurality of different call controls; and
wherein the user interface is disposed for displaying a report on the VoIP network and results of the test programs.

17. The device of claim 5, wherein the number of CODECs detectable by the device is greater than the number of CODECs implemented in the device.

18. The device of claim 5, further comprising a plurality of test programs for detecting different vendor call controls and a plurality of CODECs for making test calls.

19. The device of claim 5, wherein the master control unit comprises a metrics portion for determining at least one of jitter, loss or delay for a voice transmission over the VoIP network.

20. The device of claim 19, wherein the metrics portion comprises:
- a ping signal generator;
- a mixer operable to mix the generated ping signal and a voice stream signal to produce a mixed voice stream signal for transmission through the network to a destination device;
- a signal detector operable to receive a mixed voice stream signal from the destination device and detect a return ping signal contained in the received mixed voice stream signal; and
- a processor coupled to the signal detector and operable to determine the voice transmission delay between the test device and the destination device upon detection of the return ping signal by the signal detector based on the time of transmitting the ping signal and the time of detecting the return ping signal.

21. The device of claim 5, wherein the master control unit has registration capabilities for a plurality of call control protocols selected from the group comprising H.323, SIP, MGCP and SCCP.

22. The device of claim 5, wherein the CODEC unit has CODECs for at least one CODEC selected from the group comprising G.711A, G.711U, G.723, G.723.2, G.726, G.729A, GSM, H.261 and H.263.

23. The device of claim 5, further comprising:
- communication connector for connecting the portable test device in signal communication with the VoIP network;
- traffic generator for generating two-way traffic between a VoIP telephone and the VoIP network;
- a capture device for at least one of monitoring or capturing the generated traffic;
- an analyzer for analyzing the monitored or captured traffic to determine the configuration settings of the VoIP telephone;
- a switch for at least one of disconnecting or disabling the VoIP telephone; and
- a tester for emulating the VoIP telephone to conduct tests on the VoIP telephone line.

* * * * *